US012600042B2

(12) United States Patent
Takahashi et al.

(10) Patent No.: US 12,600,042 B2
(45) Date of Patent: Apr. 14, 2026

(54) CONTROL DEVICE AND ROBOT SYSTEM

(71) Applicant: FANUC CORPORATION, Yamanashi (JP)

(72) Inventors: Yuutarou Takahashi, Yamanashi (JP); Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 6 days.

(21) Appl. No.: 18/687,299

(22) PCT Filed: Sep. 30, 2021

(86) PCT No.: PCT/JP2021/036217
§ 371 (c)(1),
(2) Date: Feb. 28, 2024

(87) PCT Pub. No.: WO2023/053374
PCT Pub. Date: Apr. 6, 2023

(65) Prior Publication Data
US 2024/0391107 A1     Nov. 28, 2024

(51) Int. Cl.
*B25J 9/16*          (2006.01)
*B25J 19/02*         (2006.01)
(52) U.S. Cl.
CPC ............. *B25J 9/1697* (2013.01); *B25J 9/163* (2013.01); *B25J 9/1653* (2013.01); *B25J 19/023* (2013.01)
(58) Field of Classification Search
CPC ........ B25J 9/1697; B25J 9/163; B25J 9/1653; B25J 19/023; B25J 13/08; B25J 5/00; B25J 9/1692; G06T 7/70
See application file for complete search history.

(56) References Cited

U.S. PATENT DOCUMENTS

| 2018/0284802 A1 | 10/2018 | Tsai et al. |
| 2021/0060795 A1* | 3/2021 | Kiyosawa .............. B25J 13/089 |

FOREIGN PATENT DOCUMENTS

| CN | 1757492 | A | | 4/2006 |
| CN | 101239469 | A | | 8/2008 |
| CN | 102122172 | A | | 7/2011 |
| CN | 111176274 | A | | 5/2020 |
| CN | 113366401 | A | | 9/2021 |
| JP | H07116972 | A | * | 5/1995 |
| JP | H11-156764 | A | | 6/1999 |
| JP | 2004-301796 | A | | 10/2004 |
| JP | 2010-162635 | A | | 7/2010 |
| JP | 2018-107315 | A | | 7/2018 |
| JP | 2019-093481 | A | | 6/2019 |
| JP | 2021-030371 | A | | 3/2021 |
| WO | 2012099688 | A1 | | 7/2012 |

* cited by examiner

*Primary Examiner* — Bao Long T Nguyen
(74) *Attorney, Agent, or Firm* — HAUPTMAN HAM, LLP

(57)                ABSTRACT

This control device comprises a correction amount calculation unit for calculating a correction amount for an operation of a mobile robot with respect to a work space according to information from a visual sensor mounted on the robot, and a control unit for modifying the imaging position and/or imaging orientation of the visual sensor on the basis of the correction amount and applying a correction to the operation of the robot on the basis of the information from the visual sensor after the modification.

6 Claims, 8 Drawing Sheets

Fig. 2

<FIRST CORRECTION>

<SECOND AND SUBSEQUENT
CORRECTIONS>

START

S7

MOVE MOVABLE TYPE ROBOT

S8

MOVE VISION SENSOR BASED ON
PAST SHIFT AMOUNT
(CORRECTION AMOUNT)

S9

IMAGE REFERENCE POINT

S10

DETECT THREE-DIMENSIONAL
INFORMATION

S11

CALCULATE SHIFT AMOUNT
(CORRECTION AMOUNT)

S12

CORRECT OPERATION OF ROBOT

END

Fig. 5

DETECTED THREE-DIMENSIONAL INFORMATION

REFERENCE THREE-DIMENSIONAL INFORMATION

REFERENCE IMAGE

DETECTED IMAGE

CONTROL DEVICE AND ROBOT SYSTEM

RELATED APPLICATIONS

The present application is a National Phase of International Application No. PCT/JP2021/036217 filed Sep. 30, 2021.

TECHNICAL FIELD

The present invention relates to a robot control technique, and more particularly relates to a controller and a robot system that correct the operation of a robot.

BACKGROUND ART

In recent years, many robot systems have been proposed in which a movable type robot such as a robot mounted at a convey device such as a carriage, an automated guided vehicle (AGV), or a convey rail system or a robot integrated with a convey device is moved to the vicinity of a machine such as a machine tool or a construction machine or to the vicinity of a workpiece such as a vehicle, an aircraft, a building, or components thereof so as for the robot to perform various operations.

When such a movable type robot performs various work such as loading/unloading of a workpiece, replacement of a tool, or processing (e.g., cutting, polishing, welding, fitting, fastening, sealing) of a workpiece, if the stopping position or the stopping orientation of the movable type robot is changed, or if the position or the orientation of a machine or a workpiece which is a work target in a workspace is changed, the position or the orientation of the robot with respect to the workspace also changes. Consequently, the robot may not be able to appropriately perform the work only by carrying out the same operation every time. For this reason, a technique has been proposed in which a shift in the position or the orientation of a robot with respect to a workspace is measured and the operation of the robot is corrected.

As a method of correcting the operation of a robot, there is a technique in which, for example, a vision sensor is attached to a hand or the like of the robot, three-dimensional positions of a plurality of reference points set at a workspace are detected using the vision sensor, a shift amount (correction amount) of the robot from a reference position or a reference orientation with respect to the workspace is calculated, and then the operation of the robot is corrected (for example, Patent Literature 1 and Patent Literature 2). However, when, for example, the movable type robot moves to the vicinity of another machine or another workpiece and the stopping position or the stopping orientation of the movable type robot is changed, or when the position or the orientation of a machine or a workpiece which is a work target in the workspace is changed, the reference points located at the workspace may be outside the field of view of the vision sensor. Therefore, in order to ensure that the reference points are within the field of view of the vision sensor, it may involve time and effort or a trial-and-error process for manually changing the stopping position or the stopping orientation of the movable type robot, manually changing the position or the orientation of the machine or the workpiece which is a work target, or re-teaching an imaging position or an imaging orientation. As a result, a process of correcting the robot takes considerable time.

Patent Literature 1 describes that a vision sensor is fixed at an automated guided vehicle at which a robot is mounted, a mark is provided on a work table, and a handling position of the robot with respect to a workpiece is corrected based on a position shift amount of the mark detected by the vision sensor in a state in which the automated guided vehicle is stopped at a teaching position.

Patent Literature 2 describes that when an imaging means detects a position of a reference point in a state in which an automated guided vehicle mounted with a robot is stopped and the robot performs predetermined work on a workpiece in this stopped state, the time required for the work increases, making it difficult to achieve a short tact time, and thus a camera is attached at a first moving object mounted with the robot and obtains two or more images of a reference object captured at different times in a state in which the first moving object is moving, and predetermined work is performed based on the two or more images captured in the state in which the first moving object is moving.

CITATION LIST

Patent Literature

PTL 1: Japanese Unexamined Patent Publication No. 11-156764A

PTL 2: Japanese Unexamined Patent Publication No. 2019-093481A

SUMMARY OF INVENTION

Technical Problem

In view of the known problems, the present invention is aimed at providing a technique for automatizing a process of correcting a robot.

Solution to Problem

An aspect of the present disclosure provides a controller including: a correction amount calculating unit that calculates a correction amount of an operation of a robot with respect to a workspace from information of a vision sensor mounted at a movable type robot; and a control unit that changes at least one selected from a group of an imaging position and an imaging orientation of the vision sensor based on the correction amount and corrects the operation of the robot based on information of the vision sensor after the change.

Another aspect of the present disclosure provides a robot system including: a movable type robot; a vision sensor mounted at the movable type robot; a correction amount calculating unit that calculates a correction amount of an operation of the robot with respect to a workspace from information of the vision sensor; and a control unit that changes at least one selected from a group of an imaging position and an imaging orientation of the vision sensor based on the correction amount and corrects the operation of the robot based on information of the vision sensor after the change.

Advantageous Effects of Invention

According to an aspect of the present disclosure, even when the stopping position or the stopping orientation of the movable type robot is changed, or even when the position or the orientation of a machine or a workpiece which is a work target is changed, at least one selected from a group of the imaging position and the imaging orientation of the vision sensor is automatically changed based on the correction amount. This eliminates time and effort or a trial-and-error process for manually changing the stopping position or the stopping orientation of the movable type robot, manually changing the position or the orientation of the machine or the workpiece which is a work target, or re-teaching an imaging position or an imaging orientation so as to ensure that a reference point is within a field of view of the vision sensor. As a result, a process of correcting the robot can be automatized.

BRIEF DESCRIPTION OF DRAWINGS

FIG. 2 is a function block diagram of the robot system of the first embodiment.

FIG. 5 is an explanatory diagram of an example of imaging positions and orientations of a vision sensor and detected three-dimensional positions of reference points.

DESCRIPTION OF EMBODIMENTS

Figure 1:
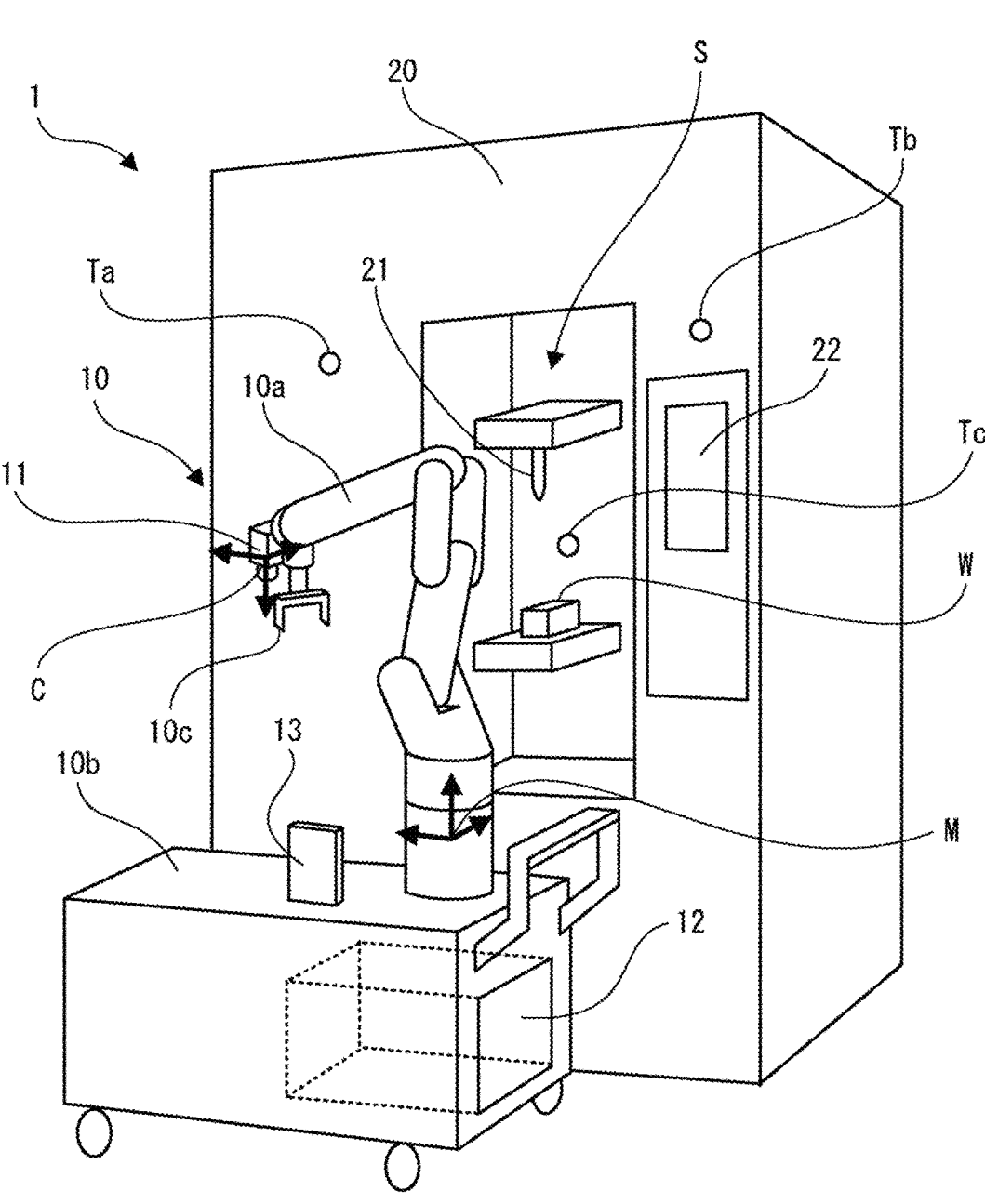
FIG. 1 is a configuration diagram of a robot system of a first embodiment.

Embodiments of the present disclosure will be described in detail below with reference to the accompanying drawings. In the drawings, identical or similar constituent elements are given identical or similar reference signs. In addition, the embodiments to be described below are not intended to limit the technical scope of the invention or the meaning of terms set forth in the claims.

A robot system 1 of a first embodiment will be described below. FIG. 1 is a configuration diagram of the robot system 1 of the first embodiment. The robot system 1 includes a movable type robot 10, a vision sensor 11, and a controller 12 that controls the movable type robot 10. Although not essential, the robot system 1 further includes a teaching device 13 that provides teaching to the movable type robot 10 and checks the state of the movable type robot 10.

The movable type robot 10 includes a robot 10a, a convey device 10b, and a tool 10c. The movable type robot 10 is configured such that the robot 10a and the convey device 10b are removably coupled to each other, but is not limited thereto. In another embodiment, the robot 10a and the convey device 10b may be configured to be integrated with each other.

The robot 10a is configured by an articulated robot, but is not limited thereto, and may be configured by another industrial robot (robot arm) such as a single-joint robot, a double-arm robot, or a parallel-link robot, or may be configured by a robot of another type such as a humanoid in another embodiment. The robot 10a is mounted at the convey device 10b and controlled by the controller 12.

The convey device 10b is configured by a manual convey device such as a carriage, but is not limited thereto, and may be configured by an automatic convey device such as an automated guided vehicle (AGV) or a convey rail system in another embodiment. In the case of an automatic convey device, the convey device 10b may be controlled by the controller 12.

The tool 10c is configured by a hand such as a multi-fingered grip type hand or a suction type hand, but is not limited thereto, and may be configured by a processing tool such as a cutting tool, a welding tool, or a sealing tool in another embodiment. The tool 10c is removably coupled to an end part of the robot 10a.

The vision sensor 11 includes a two-dimensional sensor that outputs luminance information, but is not limited thereto, and may include a three-dimensional sensor that outputs distance information in another embodiment. In addition, the vision sensor 11 is configured by one camera, but is not limited thereto, and may be configured by two stereo cameras in another embodiment. The vision sensor 11 is mounted at the movable type robot 10. The vision sensor 11 is mounted at a wrist of the robot 10a, but is not limited thereto, and may be mounted at another movable portion such as an arm of the robot 10a, the tool 10c, or the convey device 10b in another embodiment.

The controller 12 is configured by a known programmable logic controller (PLC), but may be configured by another computer in another embodiment. The controller 12 includes a processor, a memory, an input/output interface, and the like (not illustrated) which are connected to each other via a bus. The controller 12 controls the operation of the movable type robot 10 in accordance with an operation program taught by the teaching device 13. The controller 12 controls the operation of the robot 10a, but is not limited thereto, and may control the operation of the convey device 10b in another embodiment.

The controller 12 sets various coordinate systems such as a world coordinate system, a machine coordinate system, a flange coordinate system, a tool coordinate system, a camera coordinate system, and a user coordinate system. These coordinate systems may be, for example, orthogonal coordinate systems. For ease of description, in the present embodiment, it is assumed that the controller 12 sets a machine coordinate system M and a camera coordinate system C. The machine coordinate system M is fixed at a reference position (e.g., a base) of the robot 10a. The camera coordinate system C is fixed at a reference position (e.g., a focus position) of the vision sensor 11.

The teaching device 13 is configured by a teach pendant or the like, but is not limited thereto, and may be configured by a teaching operation panel, another computer, or the like in another embodiment. The teaching device 13 edits or creates an operation program of the movable type robot 10. The teaching device 13 transmits the edited or created operation program to the controller 12.

In the robot system 1 having the above-described configuration, the movable type robot 10 is moved to the vicinity of a machine 20 which is a work target and performs work such as loading/unloading of a workpiece W or replacement of a tool of the machine 20, but is not limited to performing the above-described work. In another embodiment, the movable type robot 10 may perform other work such as processing (e.g., cutting, polishing, welding, fitting, fastening, sealing, and the like) of the workpiece W.

The machine 20 is configured by a known machine tool such as a milling machine, but is not limited thereto, and may be configured by another industrial machine such as a construction machine or an agricultural machine in another embodiment. For example, the machine 20 includes a tool 21 that processes the workpiece W and a controller 22 that controls the operation of the tool 21. The controller 22 is configured by a known computerized numerical control (CNC) device.

The movable type robot 10 performs work such as loading/unloading of the workpiece W to/from the machine 20 or replacement of the tool 21 of the machine 20 in a workspace S. When the movable type robot 10 moves to the vicinity of another machine 20 or another workpiece W and the stopping position or the stopping orientation of the movable type robot 10 (the convey device 10*b*) is changed, or when the position or the orientation of the machine 20 or the workpiece W which is a work target in the workspace S is changed, at least one selected from a group of the position and the orientation of the movable type robot 10 with respect to the workspace S is also changed. Thus, the robot 10*a* cannot appropriately perform the work only by carrying out the same operation every time.

Therefore, the controller 12 calculates a shift amount of at least one selected from a group of the position and the orientation of the movable type robot 10 with respect to the workspace S from the information of the vision sensor 11 as a correction amount, and corrects the operation of the movable type robot 10 (the robot 10*a*) based on the shift amount (correction amount). The controller 12 corrects the operation of the robot 10*a* based on the shift amount (correction amount), but, when the convey device 10*b* is an automatic convey device, may correct the operation of the convey device 10*b* based on the shift amount (correction amount).

In order to calculate the shift amount of at least one selected from a group of the position and the orientation of the movable type robot 10 with respect to the workspace S, the controller 12 detects the three-dimensional positions of reference points Ta, Tb, and Tc in the workspace S from the information of the vision sensor 11. A stereo method is used for detecting the three-dimensional positions of the reference points Ta, Tb, and Tc, but another three-dimensional measurement method such as a time of flight (TOF) method, a projected light method (a light section method, a phase shift method, a spatial coding method, or the like), or a focal method may be used in another embodiment.

In order to calculate at least one selected from a group of the position or the orientation of the movable type robot 10 with respect to the workspace S, a plurality of (at least two or more) reference points Ta, Tb, and Tc are required. For example, the reference points Ta, Tb, and Tc are three target marks set in the workspace S, but are not limited thereto. In another embodiment, the reference points Ta, Tb, and Tc may be known feature points existing in the workspace S, such as corner portions of the machine 20, for example.

In order to accurately calculate at least one selected from a group of the position and the orientation of the movable type robot 10 with respect to the workspace S, the plurality of reference points Ta, Tb, and Tc are preferably set to be separated from each other as much as possible. For example, the two reference points Ta and Tb are set at positions outside the machine 20 (e.g., outside on the right side and outside on the left side of the machine 20), respectively, and the one reference point Tc is set inside the machine 20 (e.g., above the workpiece W), but not limited thereto. In another embodiment, one reference point may be set outside the machine 20 and two reference points may be set inside the machine 20.

The controller 12 operates the robot 10*a* and sequentially moves the vision sensor 11 to at least one selected from a group of the imaging position and the imaging orientation, and the vision sensor 11 sequentially images the reference points Ta, Tb, and Tc. The controller 12 detects detected three-dimensional information including detected three-dimensional positions of the reference points Ta, Tb, and Tc based on the information of the vision sensor 11, calculates a shift amount of the movable type robot 10 from at least one selected from a group of a reference position and a reference orientation with respect to the workspace S based on the detected three-dimensional information and reference three-dimensional information including reference three-dimensional positions of the reference points Ta, Tb, and Tc as a correction amount, and corrects the operation of the movable type robot 10 based on the shift amount (correction amount).

Figure 2:
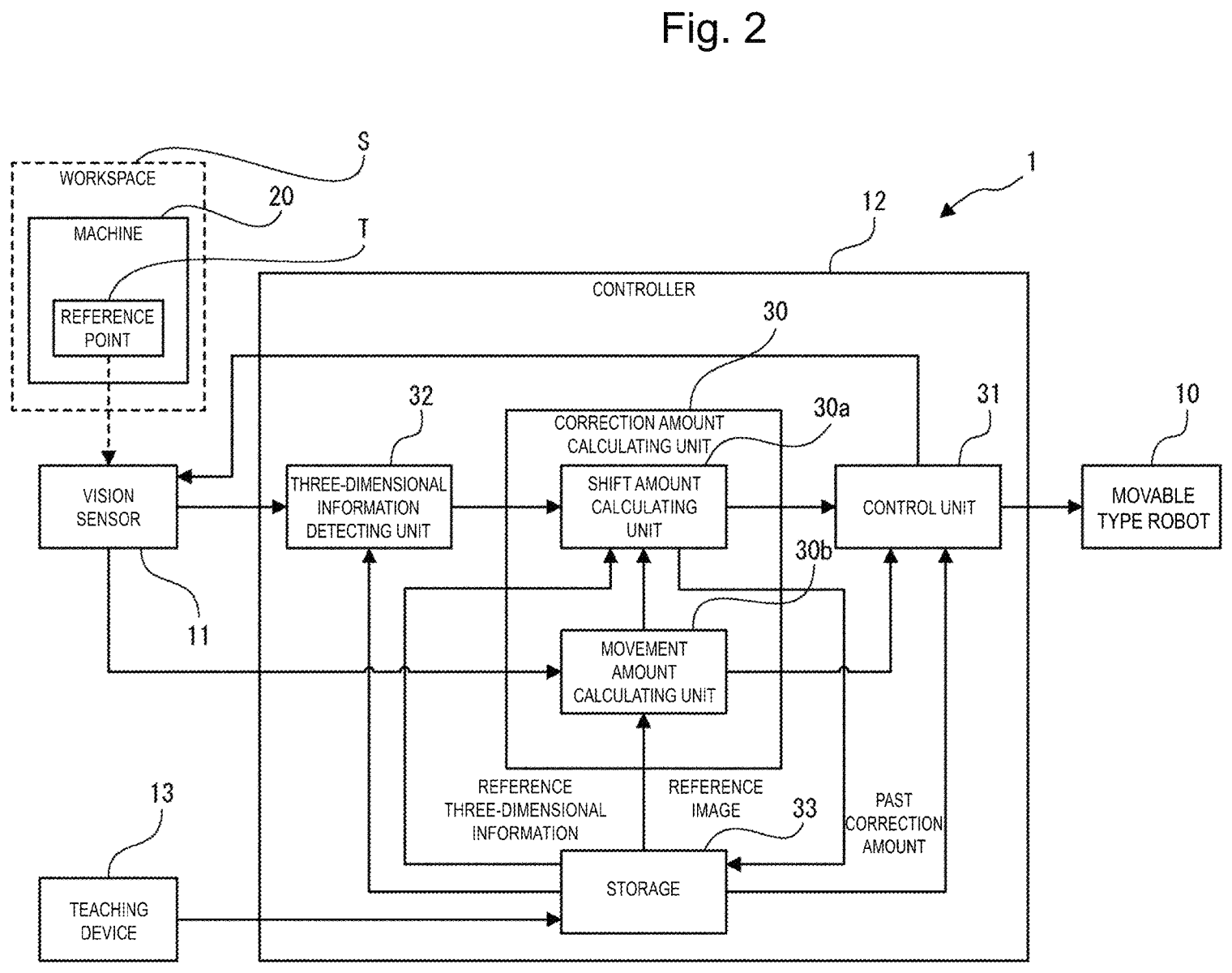

FIG. 2 is a function block diagram of the robot system 1 of the first embodiment. The controller 12 includes a storage 33, a three-dimensional information detecting unit 32, a correction amount calculating unit 30, and a control unit 31. The storage 33 is configured by a memory such as a RAM or a ROM. The components other than the storage 33 are configured by a part or all of a computer program, but are not limited thereto, and may be configured by a part or all of a semiconductor integrated circuit in another embodiment. In another embodiment, the components other than the control unit 31 may be disposed at an external computer device connectable to the controller 12 in a wired or wireless manner.

The storage 33 stores various kinds of information such as an operation program of the movable type robot 10, calibration data (so-called internal parameters and external parameters) of the vision sensor 11, reference three-dimensional information including a reference three-dimensional position of a reference point T, and a past shift amount (correction amount). The reference point T is an abbreviated notation of the plurality of reference points Ta, Tb, and Tc.

The three-dimensional information detecting unit 32 detects detected three-dimensional information including a detected three-dimensional position of the reference point T based on the information of the vision sensor 11. As described above, the three-dimensional information detecting unit 32 detects the detected three-dimensional position of the reference point T using a stereo method, but is not limited thereto. In another embodiment, another three-dimensional measurement method such as a TOF method, a projected light method, or a focal method may be used. The three-dimensional information detecting unit 32 transmits the detected three-dimensional information to the correction amount calculating unit 30.

The correction amount calculating unit 30 includes a shift amount calculating unit 30*a*. The shift amount calculating unit 30*a* is configured by a part or all of a computer program, but is not limited thereto, and may be configured by a part or all of a semiconductor integrated circuit in another embodiment. The shift amount calculating unit 30*a* calculates a shift amount (correction amount) of the movable type robot 10 from at least one selected from a group of the reference position and the reference orientation with respect to the workspace S based on the detected three-dimensional information and the reference three-dimensional information stored in advance. The shift amount calculating unit 30*a* transmits the calculated shift amount (correction amount) to the control unit 31 and stores the shift amount (correction amount) in the storage 33 as a past correction amount.

The control unit 31 corrects the operation of the movable type robot 10 based on the shift amount (correction amount). The control unit 31 corrects the operation of the robot 10*a* based on the shift amount (correction amount), but may correct the operation of the convey device 10*b* based on the shift amount (correction amount) in another embodiment.

When the movable type robot 10 moves to the vicinity of another machine 20 or another workpiece W and the stopping position or the stopping orientation of the movable type robot 10 (the convey device 10b) is changed, or when the position or the orientation of the machine 20 or the workpiece W which is a work target is changed, the reference point T may be outside the field of view of the vision sensor 11. Thus, when a past shift amount (correction amount) is already stored in the storage 33, first, the control unit 31 automatically changes at least one selected from a group of the imaging position and the imaging orientation of the vision sensor 11 based on the past shift amount (correction amount) and operates the movable type robot 10. After the change, the control unit 31 transmits an imaging command to the vision sensor 11, and the vision sensor 11 images the reference point T in response to the imaging command.

Accordingly, the reference point T becomes highly likely to fall within the field of view of the vision sensor 11, eliminating time and effort for manually changing the stopping position or the stopping orientation of the movable type robot 10 (the convey device 10b), time and effort for manually changing the position or the orientation of the machine 20 or the workpiece W which is a work target, or a trial-and-error process for re-teaching an imaging position or an imaging orientation so as to ensure that the reference point T is within the field of view of the vision sensor 11. As a result, a process of correcting the movable type robot 10 can be automatized.

After the reference point T falls within the field of view of the vision sensor 11, the three-dimensional information detecting unit 32 detects detected three-dimensional information including a detected three-dimensional position of the reference point T based on the information of the vision sensor 11, the correction amount calculating unit 30 calculates a shift amount (correction amount) of the movable type robot 10 from at least one selected from a group of the reference position and the reference orientation with respect to the workspace S based on the detected three-dimensional information and the reference three-dimensional information including the reference three-dimensional position of the reference point T, and the control unit 31 corrects the operation of the movable type robot 10 based on the shift amount (correction amount).

Figure 3:
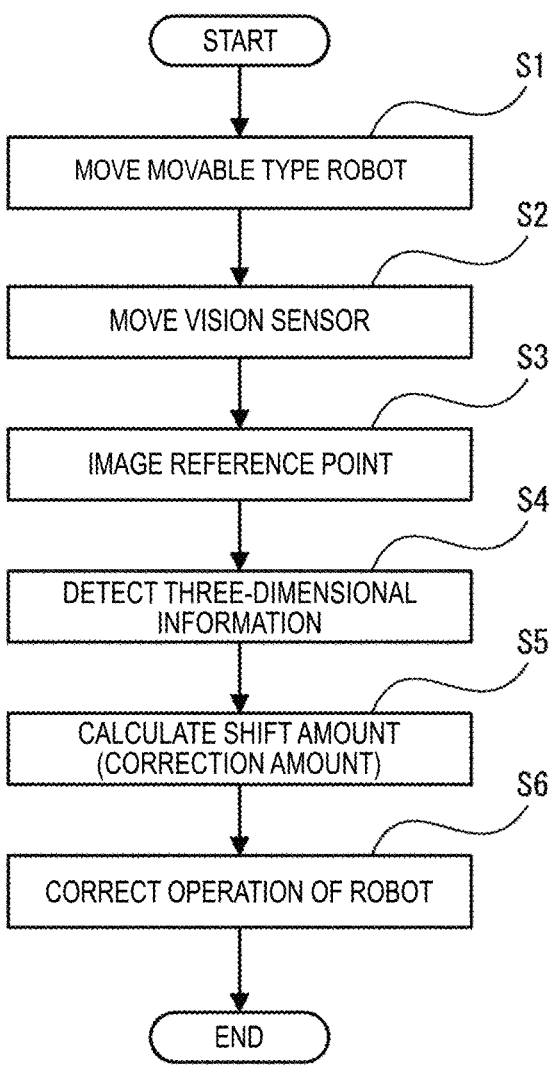
FIG. 3 is a flowchart of a first correction for the robot system of the first embodiment.

The detailed operation of the robot system 1 of the first embodiment will be described below with reference to FIG. 3 to FIG. 6. FIG. 3 is a flowchart of a first correction for the robot system 1 of the first embodiment. The first correction is a process of correcting the operation of the robot when no past shift amount (correction amount) is stored in the storage 33.

In the first correction, first, in step S1, the movable type robot 10 (the convey device 10b) is manually or automatically moved to the reference position or the reference orientation. In step S2, the control unit 31 operates the movable type robot 10 and moves the vision sensor 11 to at least one selected from a group of an imaging position and an imaging orientation taught in advance.

Figure 5:
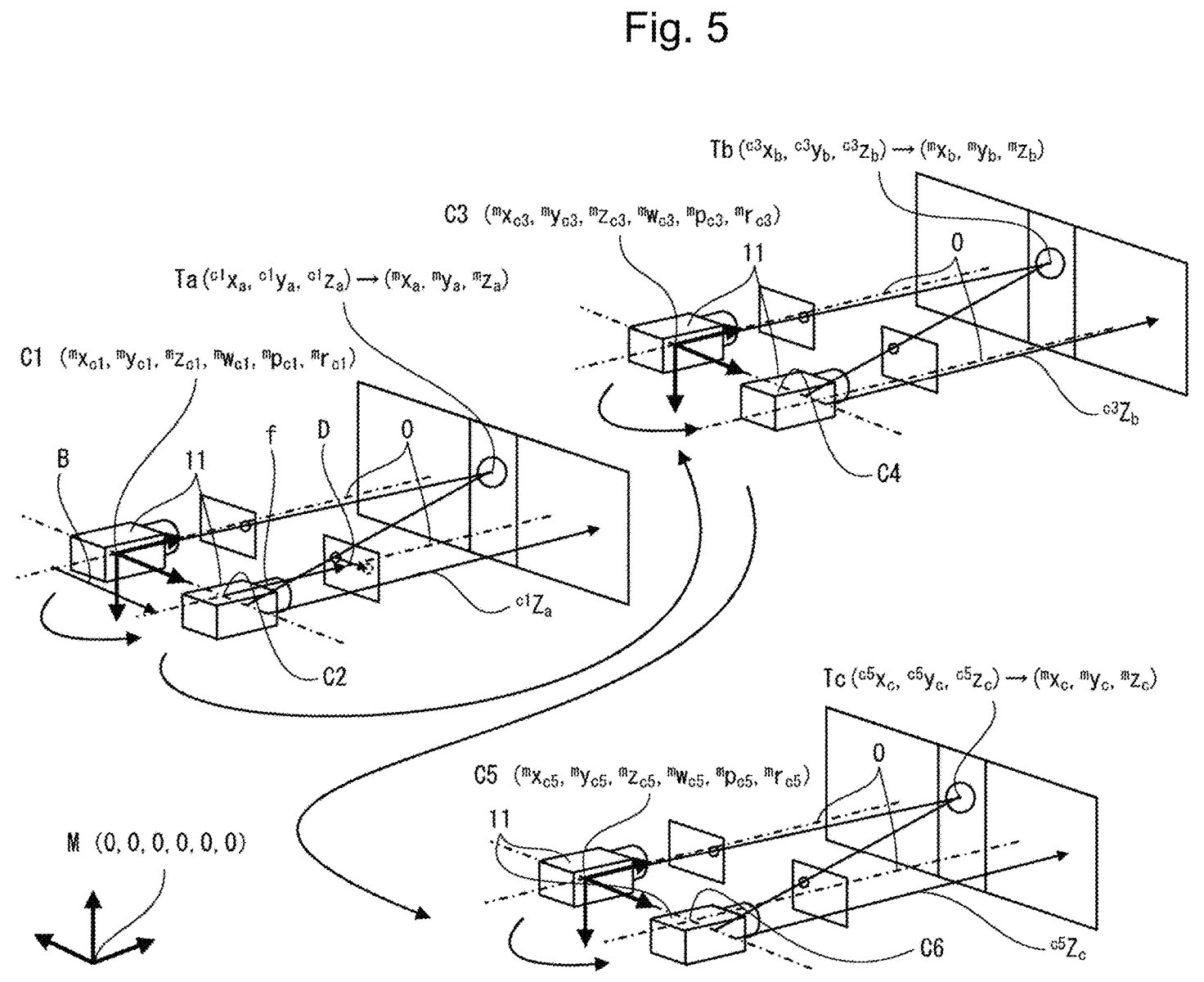

FIG. 5 is an explanatory diagram of an example of imaging positions and orientations C1 to C6 of the vision sensor 11 and detected three-dimensional positions of the reference points Ta, Tb, and Tc. The imaging positions and orientations C1 to C6 each includes at least one selected from a group of an imaging position and an imaging orientation. When a stereo method is used, imaging is performed twice at different positions for one reference point. Thus, when there are three reference points Ta, Tb, and Tc, there are six imaging positions and orientations C1 to C6. However, it should be noted that, in another embodiment using a TOF method or a light section method, there are three imaging positions and orientations. It is assumed that the imaging positions and orientations C1 to C6 are taught in advance.

Referring to FIG. 3 again, in step S3, the vision sensor 11 images the reference points Ta, Tb, and Tc at the imaging positions and orientations C1 to C6. When the reference points Ta, Tb, and Tc are out of the field of view of the vision sensor 11, in the first correction, the stopping position or the stopping orientation of the movable type robot 10 (the convey device 10b) is manually changed, or the position or the orientation of the machine 20 or the workpiece W which is a work target is manually changed, or the imaging position or the imaging orientation of the vision sensor 11 is re-taught such that the reference points Ta, Tb, and Tc fall within the field of view of the vision sensor 11.

As illustrated in FIG. 5, particularly in the case of using a stereo method, when the reference points Ta, Tb, and Tc are located at ends of the field of view of the vision sensor 11, the distance (i.e., parallax) between the reference point T appearing in two captured images can be increased, whereby the accuracy of the three-dimensional positions of the reference points Ta, Tb, and Tc is improved. Therefore, when a stereo method is used, the stopping position or the stopping orientation of the movable type robot 10 (the convey device 10b) is manually changed, or the position or the orientation of the machine 20 or the workpiece W which is a work target is manually changed, or the imaging position or the imaging orientation of the vision sensor 11 is re-taught such that the reference point T is located at an end of the field of view of the vision sensor 11.

Referring to FIG. 3 again, in step S4, the three-dimensional information detecting unit 32 detects detected three-dimensional information including detected three-dimensional positions of the reference points Ta, Tb, and Tc based on the information of the vision sensor 11.

A detection example of the detected three-dimensional positions of the reference points Ta, Tb, and Tc will be described below with reference to FIG. 5. For ease of description, it is assumed that the vision sensor 11 is arranged in isometric parallel at the imaging positions and orientations C1 and C2, at the imaging positions and orientations C3 and C4, and at the imaging positions and orientations C5 and C6. In other words, between the imaging positions and orientations C1 and C2, between the imaging positions and orientations C3 and C4, and between the imaging positions and orientations C5 and C6, the vision sensor 11 is separated by a baseline length B, an optical axis O of the vision sensor 11 is arranged in parallel, an image sensor of the vision sensor 11 is arranged in a plane orthogonal to the optical axis O, and the x direction and the y direction of the image sensor are oriented in the same directions.

For the imaging positions and orientations C1 and C2, for example, when the imaging position and orientation C1 out of the two imaging positions and orientations C1 and C2 is the origin of the camera coordinate system C, each of the imaging positions and orientations C1 and C2 is a focus position of the vision sensor 11, a focal distance of the vision sensor 11 is f, a parallax of the reference point Ta appearing in two captured images is D, and a pixel pitch of the vision sensor 11 is 1 mm (=1 pixel), then the distance from the origin of the camera coordinate system C to the reference point Ta, that is, the Z coordinate $^{c1}z_a$ of the reference point Ta in the camera coordinate system C is determined from the following equation by the stereo method.

[Math. 1]

$$^{c1}z_a = \frac{Bf}{D} \qquad \text{Equation 1}$$

In $^{c1}z_a$, the upper left subscript represents the origin of a coordinate system, and the lower right subscript represents a coordinate point in the coordinate system. In other words, $^{c1}z_a$ represents the Z coordinate of the reference point Ta in the camera coordinate system C in which the origin of the camera coordinate system C is located at the imaging position and orientation C1.

Since the baseline length B and the focal distance f are constants determined by the two imaging positions and orientations and the design of the vision sensor 11, the three-dimensional information detecting unit 32 can detect the z coordinate $^{c1}z_a$ of the reference point Ta by calculating the parallax D of the reference point Ta appearing in the two captured images based on image processing such as detection processing and matching processing of the reference point Ta.

In an image coordinate system having the origin at the upper left end of a captured image, when the image coordinate of the reference point T appearing in the captured image is (x, y) and the image center of the image coordinate system is ($c_x$, $c_y$), then the three-dimensional information detecting unit 32 calculates the x coordinate $^{c1}x_a$ and the y coordinate $^{c1}y_a$ of the reference point Ta in the camera coordinate system C from, for example, the following equations.

[Math. 2]

$$^{c1}x_a = \frac{(x - c_x) \cdot {}^{c1}z_a}{f} \qquad \text{Equation 2}$$

[Math. 3]

$$^{c1}y_a = \frac{(y - c_y) \cdot {}^{c1}z_a}{f} \qquad \text{Equation 3}$$

In $^{c1}x_a$ and $^{c1}y_a$, the upper left subscript represents the origin of a coordinate system, and the lower right subscript represents a coordinate point in the coordinate system (the same applies hereinafter). In other words, $^{c1}x_a$ and $^{c1}y_a$ respectively represent the X coordinate and the Y coordinate of the reference point Ta in the camera coordinate system C when the origin of the camera coordinate system C is located at the imaging position and orientation C1.

The three-dimensional information detecting unit 32 may also perform an aberration correction as necessary. It is assumed that internal parameters of the vision sensor 11 such as a correction coefficient for an aberration correction, a focal distance f, an image center ($c_x$, $c_y$), and a pixel pitch are stored in advance in the storage 33.

From the above, the detected three-dimensional position ($^{c1}x_a$, $^{c1}y_a$, $^{c1}z_a$) of the reference point Ta in the camera coordinate system C is obtained. Similarly, the detected three-dimensional positions ($^{c3}x_b$, $^{c3}y_b$, $^{c3}z_b$), ($^{c5}x_c$, $^{c5}y_c$, $^{c5}z_c$) of the reference points Tb and Tc in the camera coordinate system C are also obtained.

Next, the three-dimensional information detecting unit 32 transforms the detected three-dimensional positions of the reference points Ta, Tb, and Tc from the camera coordinate system C into the machine coordinate system M. For the imaging positions and orientations C1, C3, and C5, when the position and the orientation of the vision sensor 11 in the machine coordinate system M (i.e., the position and the orientation of the camera coordinate system C) are C1 ($^m x_{c1}$, $^m y_{c1}$, $^m z_{c1}$, $^m w_{c1}$, $^m p_{c1}$, $^m r_{c1}$), C3 ($^m x_{c3}$, $^m y_{c3}$, $^m z_{c3}$, $^m w_{c3}$, $^m p_{c3}$, $^m r_{c3}$), and C5 ($^m x_{c5}$, $^m y_{c5}$, $^m z_{c5}$, $^m w_{c5}$, $^m p_{c5}$, $^m r_{c5}$), then external parameters (R, t)$_{c1}$, (R, t)$_{c3}$, and (R, t)$_{c5}$ of the vision sensor 11 for coordinate conversion of three-dimensional positions in the machine coordinate system M into three-dimensional positions in the camera coordinate system C are represented by the following equations as a homogeneous transformation matrix, for example. The external parameters of the vision sensor 11 are stored in advance in the storage 33.

[Math. 4]

$$(R, t)_{c1} = \begin{pmatrix} \cos {}^w r_{c1} \cos {}^m p_{c1} & \begin{matrix} \cos {}^m r_{c1} \sin {}^w p_{c1} \sin {}^m w_{c1} \\ -\sin {}^m r_{c1} \cos {}^m w_{c1} \end{matrix} & \begin{matrix} \cos {}^m r_{c1} \sin {}^w p_{c1} \cos {}^m w_{c1} \\ +\sin {}^w r_{c1} \sin {}^w w_{c1} \end{matrix} & {}^m x_{c1} \\ \sin {}^m r_{c3} \cos {}^m p_{c1} & \begin{matrix} \sin {}^m r_{c1} \sin {}^m p_{c1} \sin {}^m w_{c1} \\ +\cos {}^m r_{c1} \cos {}^m w_{c3} \end{matrix} & \begin{matrix} \sin {}^m r_{c1} \sin {}^w p_{c1} \cos {}^m w_{c1} \\ -\cos {}^m r_{c1} \sin {}^w w_{c1} \end{matrix} & {}^m y_{c3} \\ -\sin {}^m p_{c1} & \cos {}^m p_{c1} \sin {}^w w_{c1} & \cos {}^m p_{c1} \cos {}^m w_{c1} & {}^m z_{c1} \\ 0 & 0 & 0 & 1 \end{pmatrix} \qquad \text{Equation 4}$$

$$(R, t)_{c3} = \begin{pmatrix} \cos {}^w r_{c3} \cos {}^m p_{c3} & \begin{matrix} \cos {}^m r_{c3} \sin {}^w p_{c3} \sin {}^m w_{c3} \\ -\sin {}^m r_{c3} \cos {}^m w_{c3} \end{matrix} & \begin{matrix} \cos {}^m r_{c3} \sin {}^w p_{c1} \cos {}^m w_{c3} \\ +\sin {}^w r_{c3} \sin {}^w w_{c3} \end{matrix} & {}^m x_{c3} \\ \sin {}^m r_{c1} \cos {}^m p_{c3} & \begin{matrix} \sin {}^m r_{c3} \sin {}^m p_{c3} \sin {}^m w_{c3} \\ +\cos {}^m r_{c3} \cos {}^m w_{c3} \end{matrix} & \begin{matrix} \sin {}^m r_{c3} \sin {}^w p_{c3} \cos {}^m w_{c3} \\ -\cos {}^m r_{c1} \sin {}^w w_{c3} \end{matrix} & {}^m y_{c3} \\ -\sin {}^m p_{c3} & \cos {}^m p_{c3} \sin {}^w w_{c1} & \cos {}^m p_{c3} \cos {}^m w_{c3} & {}^m z_{c3} \\ 0 & 0 & 0 & 1 \end{pmatrix}$$

$$(R, t)_{c3} = \begin{pmatrix} \cos {}^w r_{c3} \cos {}^m p_{c3} & \begin{matrix} \cos {}^m r_{c3} \sin {}^w p_{c3} \sin {}^m w_{c3} \\ -\sin {}^m r_{c3} \cos {}^m w_{c3} \end{matrix} & \begin{matrix} \cos {}^m r_{c3} \sin {}^w p_{c3} \cos {}^m w_{c3} \\ +\sin {}^w r_{c3} \sin {}^w w_{c3} \end{matrix} & {}^m x_{c3} \\ \sin {}^m r_{c1} \cos {}^m p_{c3} & \begin{matrix} \sin {}^m r_{c3} \sin {}^m p_{c3} \sin {}^m w_{c3} \\ +\cos {}^m r_{c3} \cos {}^m w_{c3} \end{matrix} & \begin{matrix} \sin {}^m r_{c3} \sin {}^w p_{c3} \cos {}^m w_{c3} \\ -\cos {}^m r_{c3} \sin {}^w w_{c3} \end{matrix} & {}^m y_{c3} \\ -\sin {}^m p_{c3} & \cos {}^m p_{c3} \sin {}^w w_{c3} & \cos {}^m p_{c3} \cos {}^m w_{c3} & {}^m z_{c3} \\ 0 & 0 & 0 & 1 \end{pmatrix}$$

In the above equations, R represents a rotation matrix (from the first row and the first column to the third row and the third column of the homogeneous transformation matrix), and t represents a translation amount, that is, a translation vector (from the first row and the fourth column to the third row and the fourth column of the homogeneous transformation matrix). In addition, $^{m}x_{c1}$, $^{m}y_{c1}$, $^{m}z_{c1}$ are respectively the X coordinate, the Y coordinate, and the Z coordinate of the imaging position and orientation C1 of the vision sensor 11 (position of the camera coordinate system C) in the machine coordinate system M, and $^{m}w_{c1}$, $^{m}p_{c1}$, $^{m}r_{c1}$ are respectively the rotation amount about the X axis, the rotation amount about the Y axis, and the rotation amount about the Z axis of the imaging position and orientation C1 of the vision sensor 11 (orientation of the camera coordinate system) in the machine coordinate system M. The same applies to the imaging positions and orientations C3 and C5.

Thus, the detected three-dimensional positions $(^{c1}x_{a}, {}^{c1}y_{a}, {}^{c1}z_{a})$, $(^{c3}x_{b}, {}^{c3}y_{b}, {}^{c3}z_{b})$, and $(^{c5}x_{c}, {}^{c5}y_{c}, {}^{c5}z_{c})$ of the reference points Ta, Tb, Tc in the camera coordinate system C are respectively transformed into the three-dimensional positions $(^{m}x_{a}, {}^{m}y_{a}, {}^{m}z_{a})$, $(^{m}x_{b}, {}^{m}y_{b}, {}^{m}z_{b})$, and $^{m}x_{c}, {}^{m}y_{c}, {}^{m}z_{c})$ of the reference points Ta, Tb, and Tc in the machine coordinate system M by the following equations.

[Math. 5]

$$\begin{pmatrix} {}^{m}x_{a} \\ {}^{m}y_{a} \\ {}^{m}z_{a} \end{pmatrix} = R_{c1}^{T} \left( \begin{pmatrix} {}^{c1}x_{a} \\ {}^{c1}y_{a} \\ {}^{c1}y_{a} \end{pmatrix} - t_{c1} \right) \qquad \text{Equation 5}$$

$$\begin{pmatrix} {}^{m}x_{b} \\ {}^{m}y_{b} \\ {}^{m}z_{b} \end{pmatrix} = R_{c3}^{T} \left( \begin{pmatrix} {}^{c3}x_{b} \\ {}^{c3}y_{b} \\ {}^{c3}y_{b} \end{pmatrix} - t_{c3} \right)$$

$$\begin{pmatrix} {}^{m}x_{c} \\ {}^{m}y_{c} \\ {}^{m}z_{c} \end{pmatrix} = R_{c1}^{T} \left( \begin{pmatrix} {}^{c5}x_{c} \\ {}^{c5}y_{c} \\ {}^{c5}y_{c} \end{pmatrix} - t_{c5} \right)$$

In the above equations, $R^{T}$ represents a transposed matrix of the rotation matrix R. From the above, the three-dimensional information detecting unit 32 detects the detected three-dimensional positions of the reference points Ta, Tb, and Tc in the machine coordinate system M.

Referring to FIG. 3 again, in step S5, the shift amount calculating unit 30a calculates a shift amount (correction amount) of the movable type robot 10 from at least one selected from a group of the reference position and the reference orientation with respect to the workspace S based on the detected three-dimensional information including the detected three-dimensional positions of the reference points Ta, Tb, and Tc and the reference three-dimensional information including the reference three-dimensional positions of the reference points Ta, Tb, and Tc. Further, the shift amount calculating unit 30a stores the calculated shift amount (correction amount) in the storage 33 as a past correction amount.

Figure 6:
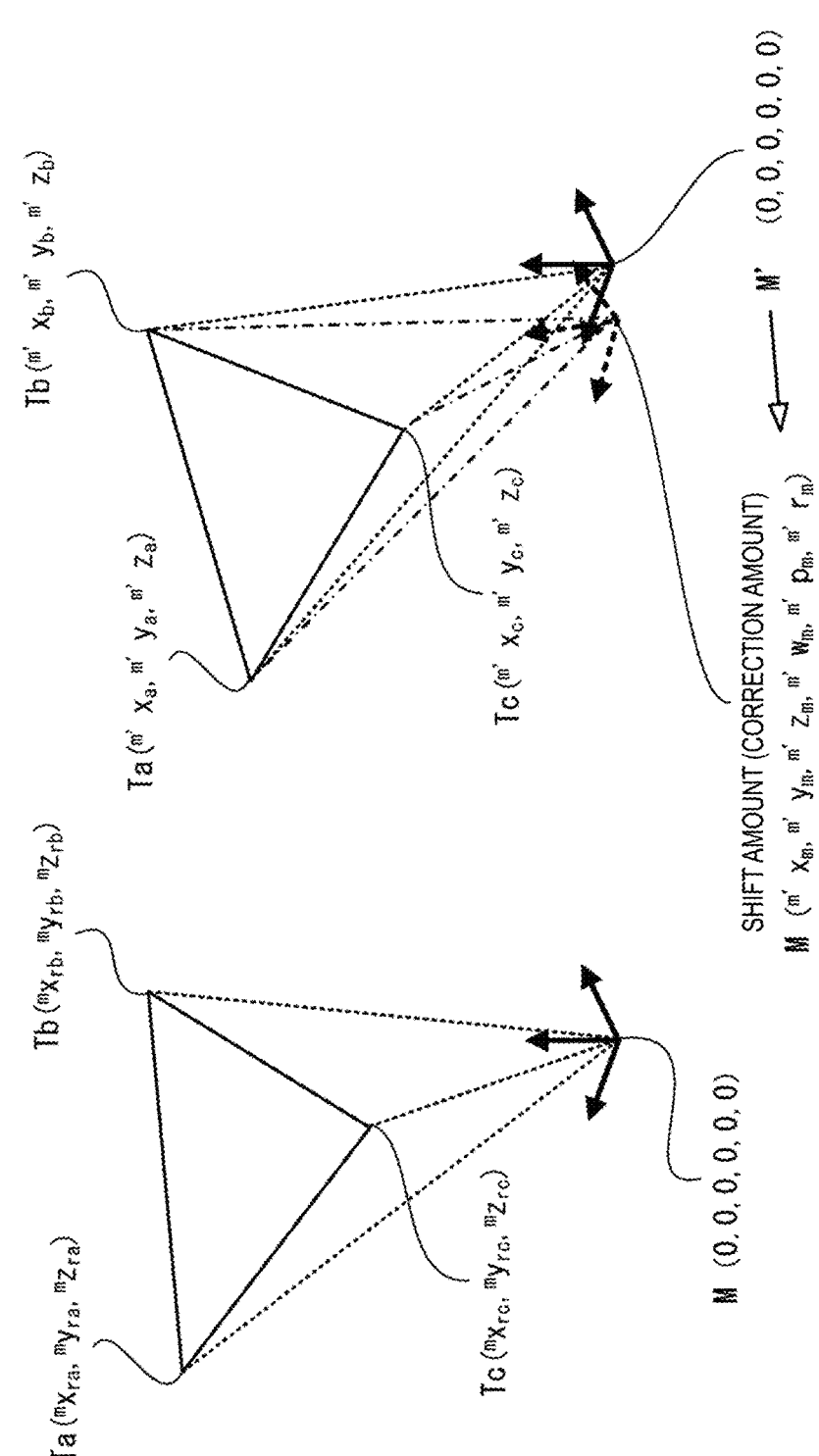
FIG. 6 is an explanatory diagram of a calculation example of a shift amount (correction amount) of a movable type robot.

A calculation example of a shift amount of the movable type robot 10 from at least one selected from a group of the reference position and the reference orientation with respect to the workspace S will be described below. FIG. 6 is an explanatory diagram of a calculation example of a shift amount (correction amount) of the movable type robot 10. FIG. 6 illustrates reference three-dimensional information and detected three-dimensional information. The reference three-dimensional information includes the reference three-dimensional positions Ta $(^{m}x_{ra}, {}^{m}y_{ra}, {}^{m}z_{ra})$, Tb $(^{m}x_{rb}, {}^{m}y_{rb}, {}^{m}z_{rb})$, and Tc $(^{m}x_{rc}, {}^{m}y_{rc}, {}^{m}z_{rc})$ of the reference points Ta, Tb, and Tc in the machine coordinate system (0, 0, 0, 0, 0, 0). On the other hand, the detected three-dimensional information includes the detected three-dimensional positions Ta $(^{m'}x_{a}, {}^{m'}y_{a}, {}^{m'}z_{a})$, Tb $(^{m'}x_{b}, {}^{m'}y_{b}, {}^{m'}z_{b})$, and Tc $(^{m'}x_{c}, {}^{m'}y_{c}, {}^{m'}z_{c})$ of the reference points Ta, Tb, and Tc in a machine coordinate system M' (0, 0, 0, 0, 0, 0) which is shifted from the machine coordinate system M of the reference three-dimensional information due to a shift in the stopping position or the stopping orientation of the movable type robot 10 (the convey device 10b) or a shift in the position or the orientation of the machine 20 or the workpiece W which is a work target.

Assuming that a triangular pyramid whose base is composed of the reference points Ta, Tb, and Tc and whose apex is the origin of the machine coordinate system M is rotated and translated on the machine coordinate system M' of the detected three-dimensional information in the reference three-dimensional information, a shift amount (correction amount) of the movable type robot 10 from at least one selected from a group of the reference position and the reference orientation with respect to the workspace S corresponds to the position and the orientation of the machine coordinate system M of the reference three-dimensional information in the machine coordinate system M' of the detected three-dimensional information. In other words, a shift amount (correction amount) of the movable type robot 10 from at least one selected from a group of the reference position and the reference orientation with respect to the workspace S can be expressed as M $(^{m'}x_{m}, {}^{m'}y_{m}, {}^{m'}z_{m}, {}^{m'}w_{m}, {}^{m'}p_{m}, {}^{m'}r_{m})$. It should be noted that $^{m'}x_{m}$, $^{m'}y_{m}$, and $^{m'}z_{m}$ are respectively the X coordinate, the Y coordinate, and the Z coordinate of the position of the machine coordinate system M of the reference three-dimensional information in the machine coordinate system M' of the detected three-dimensional information, and $^{m'}w_{m}$, $^{m'}p_{m}$, and $^{m'}r_{m}$ are respectively the orientations (the rotation amount about the X axis, the rotation amount about the Y axis, and the rotation amount about the Z axis) of the machine coordinate system M of the reference three-dimensional information in the machine coordinate system M' of the detected three-dimensional information.

At this time, assuming that each point of the triangular pyramid in the reference three-dimensional information, that is, M (0, 0, 0), Ta $(^{m}x_{ra}, {}^{m}y_{ra}, {}^{m}z_{ra})$, Tb $(^{m}x_{b}, {}^{m'}y_{b}, {}^{m'}z_{b})$, and Tc $(^{m'}x_{c}, {}^{m'}y_{c}, {}^{m'}z_{c})$ are rotated and translated in the machine coordinate system M' of the detected three-dimensional information and then moved to M $(^{m'}x_{m}, {}^{m'}y_{m}, {}^{m'}z_{m})$, Ta $(^{m'}x_{a}, {}^{m'}y_{a}, {}^{m'}z_{a})$, Tb $(^{m'}x_{b}, {}^{m'}y_{b}, {}^{m'}z_{b})$, and Tc $(^{m'}x_{c}, {}^{m'}y_{c}, {}^{m'}z_{c})$, the following relation equation is established between the reference three-dimensional positions of the reference points Ta, Tb, and Tc and the detected three-dimensional positions of the reference points Ta, Tb, and Tc.

[Math. 6]

$$\begin{pmatrix} {}^{m'}x_m & {}^{m'}x_a & {}^{m'}x_b & {}^{m'}x_c \\ {}^{m'}y_m & {}^{m'}y_a & {}^{m'}y_b & {}^{m'}y_c \\ {}^{m'}z_m & {}^{m'}z_a & {}^{m'}z_b & {}^{m'}z_c \\ 1 & 1 & 1 & 1 \end{pmatrix} = \qquad \text{Equation 6}$$

$$\begin{pmatrix} r11 & r12 & r13 & {}^{m'}x_m \\ r21 & r22 & r23 & {}^{m'}y_m \\ r31 & r32 & r33 & {}^{m'}z_m \\ 0 & 0 & 0 & 1 \end{pmatrix} \begin{pmatrix} 0 & {}^{m}x_{ra} & {}^{m}x_{rb} & {}^{m}x_{rc} \\ 0 & {}^{m}y_{ra} & {}^{m}y_{rb} & {}^{m}y_{rc} \\ 0 & {}^{m}z_{rc} & {}^{m}z_{rb} & {}^{m}z_{rc} \\ 1 & 1 & 1 & 1 \end{pmatrix}$$

$$r11 = \cos {}^{m'}r_m \cos {}^{m'}p_m$$
$$r12 = \cos {}^{m'}r_m \sin {}^{m'}p_m \sin {}^{m'}w_m - \sin {}^{m'}r_m \cos {}^{m'}w_m$$
$$r13 = \cos {}^{m'}r_m \sin {}^{m'}p_m \cos {}^{m'}w_m + \sin {}^{m'}r_m \sin {}^{m'}w_m$$
$$r21 = \sin {}^{m'}r_m \cos {}^{m'}p_m$$
$$r22 = \sin {}^{m'}r_m \sin {}^{m'}p_m \sin {}^{m'}w_m + \cos {}^{m'}r_m \cos {}^{m'}w_m$$
$$r23 = \sin {}^{m'}r_m \sin {}^{m'}p_m \cos {}^{m'}w_m - \cos {}^{m'}r_m \sin {}^{m'}w_m$$
$$r33 = \cos {}^{m'}p_m \cos {}^{m'}w_m$$

In the above equation, r11 to r33 represent respective elements of a rotation matrix (from the first row and the first column to the third row and the third column of the homogeneous transformation matrix), and ${}^{m'}x_m$, ${}^{m'}y_m$, and ${}^{m'}z_m$ represent respective elements of a translation amount, that is, a translation vector (from the first row and the fourth column to the third row and the fourth column of the homogeneous transformation matrix).

When the above equation is expressed as X'=T. X and both sides thereof are multiplied by an inverse matrix $X^{-1}$ of X, then T=X'. $X^{-1}$ is obtained. The inverse matrix $X^{-1}$ of X is obtained by an adjugate matrix or a sweep-out method. In the homogeneous transformation matrix $T=X' \cdot X^{-1}$, since six variables of a shift amount (correction amount), that is, M (${}^{m'}x_m$, ${}^{m'}y_m$, ${}^{m'}z_m$, ${}^{m'}w_m$, ${}^{m'}p_m$, ${}^{m'}r_m$) are unknown, the shift amount (correction amount) of the movable type robot 10 from at least one selected from a group of the reference position and the reference orientation with respect to the workspace S can be calculated by establishing and solving at least six simultaneous equations.

It should be noted that the above-described method of calculating a shift amount (correction amount) is merely an example, and is a method based on so-called linear algebra. However, the method is not limited thereto, and another method such as geometry may be used in another embodiment. For example, since the angles formed by the sides of the triangular pyramid and the volume of the triangular pyramid in the reference three-dimensional information are invariable, inner products such as TaTb·TaM, TaTc·TaM, TbTa·TbM, TbTc·TbM, TcTa·TcM, and TcTb·TcM and the volume of the triangular pyramid determined by ⅙×(TaTb× TaTc). TaM are invariable. Thus, the shift amount (correction amount) ${}^{m'}x_m$, ${}^{m'}y_m$, ${}^{m'}z_m$, ${}^{m'}w_m$, ${}^{m'}p_m$, and ${}^{m'}r_m$ may be determined by establishing at least six equations each representing (a value calculated in the machine coordinate system M of the reference three-dimensional information)=(a value calculated in the machine coordinate system M' of the detected three-dimensional information), and solving these six equations as a set of simultaneous equations.

Referring to FIG. 3 again, in step S6, the control unit 31 corrects the operation of the movable type robot 10 based on the shift amount (correction amount). In other words, the control unit 31 corrects each teaching point constituting a motion trajectory of the robot 10a based on M (${}^{m'}x_m$, ${}^{m'}y_m$, ${}^{m'}z_m$, ${}^{m'}w_m$, ${}^{m'}p_m$, ${}^{m'}r_m$) which is the shift amount (correction amount). For example, based on the following equation, each teaching point constituting the motion trajectory of the robot 10a is corrected (coordinate-transformed) from the machine coordinate system M in which teaching is performed to the machine coordinate system M' obtained after at least one selected from a group of the position and the orientation of the movable type robot 10 is shifted with respect to the workspace S.

[Math. 7]

$$\begin{pmatrix} {}^{m'}x_{p1} & {}^{m'}x_{p2} & \dots & {}^{m'}x_{pn} \\ {}^{m'}y_{p1} & {}^{m'}y_{p2} & \dots & {}^{m'}y_{pn} \\ {}^{m'}z_{p1} & {}^{m'}z_{p2} & \dots & {}^{m'}z_{pn} \\ 1 & 1 & \dots & 1 \end{pmatrix} = \qquad \text{Equation 7}$$

$$\begin{pmatrix} r11 & r12 & r13 & {}^{m'}x_m \\ r21 & r22 & r23 & {}^{m'}y_m \\ r31 & r32 & r33 & {}^{m'}z_m \\ 0 & 0 & 0 & 1 \end{pmatrix} \begin{pmatrix} {}^{m}x_{p1} & {}^{m}x_{p2} & \dots & {}^{m}x_{pn} \\ {}^{m}y_{p1} & {}^{m}y_{p2} & \dots & {}^{m}y_{pn} \\ {}^{m}z_{p1} & {}^{m}z_{p2} & \dots & {}^{m}z_{pn} \\ 1 & 1 & \dots & 1 \end{pmatrix}$$

This is the end of the first correction. After the first correction is completed, when the movable type robot 10 moves to the vicinity of another machine 20 or another workpiece W and the stopping position or the stopping orientation of the movable type robot 10 (the convey device 10b) is further changed, or when the position or the orientation of the machine 20 or the workpiece W which is a work target in the workspace S is further changed, the robot system 1 corrects the operation of the movable type robot 10 in accordance with a flowchart of the second and subsequent corrections.

Figure 4:
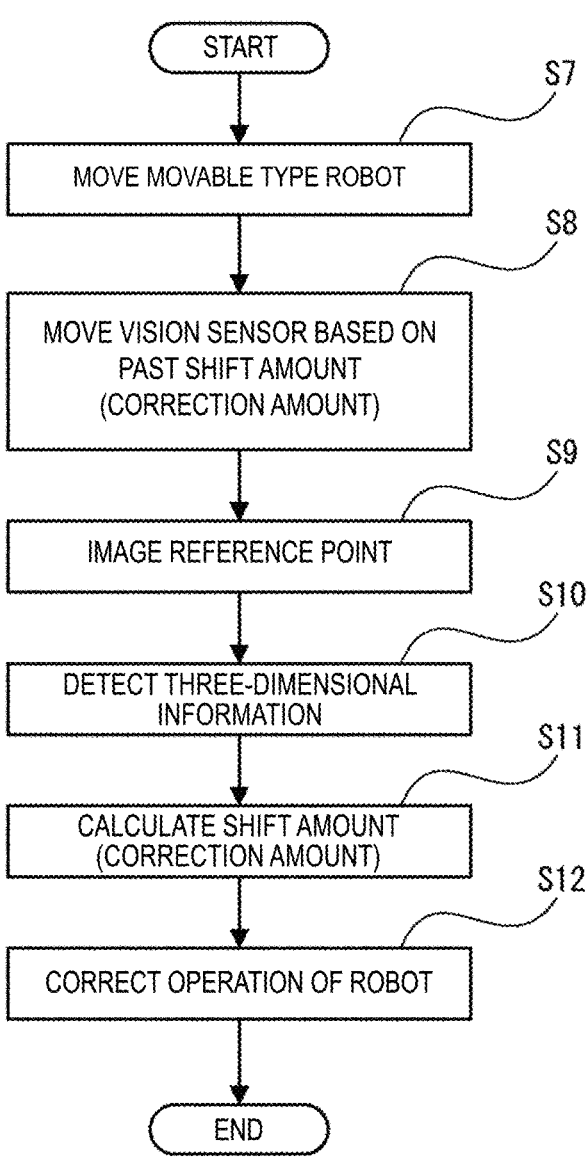
FIG. 4 is a flowchart of a second and subsequent corrections for the robot system of the first embodiment.

FIG. 4 is the flowchart of the second and subsequent corrections for the robot system 1 of the first embodiment. The second and subsequent corrections are processes of correcting the operation of the robot when a past shift amount (correction amount) is stored in the storage 33. First, in step S7, the movable type robot 10 (the convey device 10b) is manually or automatically moved to the vicinity of another machine 20 or another workpiece W. In step S8, the control unit 31 automatically changes the imaging positions and orientations C1 to C6 of the vision sensor 11 based on a past shift amount (correction amount) so as to operate the movable type robot 10. In other words, the imaging positions and orientations C1 to C6 are corrected (transformed) to imaging positions and orientations C1' to C6' based on M (${}^{m'}x_m$, ${}^{m'}y_m$, ${}^{m'}z_m$, ${}^{m'}w_m$, ${}^{m'}p_m$, ${}^{m'}r_m$) which is the past shift amount (correction amount) by, for example, the following equation.

[Math. 8]

$$\begin{pmatrix} {}^{m'}x_{c1'} & {}^{m'}x_{c2'} & \dots & {}^{m'}x_{c6'} \\ {}^{m'}y_{c1'} & {}^{m'}y_{c2'} & \dots & {}^{m'}y_{c6'} \\ {}^{m'}z_{c1'} & {}^{m'}z_{c2'} & \dots & {}^{m'}z_{c6'} \\ 1 & 1 & \dots & 1 \end{pmatrix} = \qquad \text{Equation 8}$$

$$\begin{pmatrix} r11 & r12 & r13 & {}^{m'}x_m \\ r21 & r22 & r23 & {}^{m'}y_m \\ r31 & r32 & r33 & {}^{m'}z_m \\ 0 & 0 & 0 & 1 \end{pmatrix} \begin{pmatrix} {}^{m}x_{c1} & {}^{m}x_{c2} & \dots & {}^{m}x_{c6} \\ {}^{m}y_{c1} & {}^{m}y_{c2} & \dots & {}^{m}y_{c6} \\ {}^{m}z_{c1} & {}^{m}z_{c2} & \dots & {}^{m}z_{c6} \\ 1 & 1 & \dots & 1 \end{pmatrix}$$

In step S9, the vision sensor 11 images the reference points Ta, Tb, and Tc at the changed imaging positions and orientations C1' to C6'. At this time, since the imaging positions and orientations C1 to C6 have been corrected to the imaging positions and orientations C1' to C6' based on the past shift amount (correction amount), the reference points Ta to Tc are highly likely to fall within the field of view of the vision sensor 11. In other words, as compared with the case of the first correction, the second and subsequent corrections eliminate time and effort for manually changing the stopping position or the stopping orientation of the movable type robot 10 (the convey device 10b), time and effort for manually changing the position or the orientation of the machine 20 or the workpiece W which is a work target, or a trial-and-error process for re-teaching an imaging position or an imaging orientation so as to ensure that the reference points Ta to Tc are within the field of view of the vision sensor 11. As a result, a process of correcting the movable type robot 10 can be automatized.

Particularly in the case of using a stereo method, the accuracy of the three-dimensional positions of the reference points Ta, Tb, and Tc are improved by teaching the imaging positions and orientations C1 to C6 such that the reference points Ta, Tb, and Tc are located at ends of two captured images (i.e., such that the parallax D is increased) as illustrated in FIG. 5. However, when the stopping position or the stopping orientation of the movable type robot 10 (the convey device 10b) is changed or when the position or the orientation of the machine 20 or the workpiece W which is a work target is changed, the reference points Ta, Tb, and Tc may be outside the field of view of the vision sensor 11. Thus, by automatic correction into the imaging positions and orientations C1' to C6' using the past shift amount (correction amount), the reference points Ta to Tc do not fall outside the field of view of the vision sensor 11, and are highly likely to be located at ends of the field of view of the vision sensor 11 so as to be imaged. Therefore, even when a stereo method is used, the operation of the movable type robot 10 is automatically corrected without particularly difficult teaching by a user. In addition, it is possible to achieve secondary effects of reducing the degree of difficulty in creating the operation program of the robot 10a, shortening the time for creating the operation program, and the like.

The processes from step S10 to step S12 in FIG. 4 are identical to the processes from step S4 to step S6 in FIG. 3, and thus the descriptions thereof are omitted.

As described above, according to the robot system 1 of the first embodiment, even when the stopping position or the stopping orientation of the movable type robot 10 (the convey device 10b) is changed, or even when the position or the orientation of the machine 20 or the workpiece W which is a work target is changed, at least one selected from a group of the imaging position and the imaging orientation of the vision sensor 11 is automatically changed based on a past shift amount (correction amount). This eliminates time and effort or a trial-and-error process for manually changing the stopping position or the stopping orientation of the movable type robot (the convey device 10b), manually changing the position or the orientation of the machine 20 or the workpiece W which is a work target, or re-teaching an imaging position or an imaging orientation so as to ensure that the reference points Ta, Tb, and Tc are within the field of view of the vision sensor 11. As a result, a process of correcting the robot can be automatized.

A robot system 1 of a second embodiment will be described below. Referring to FIG. 1 again, the robot system 1 of the second embodiment calculates a movement amount of the movable type robot 10 as a correction amount such that a detected image acquired from the vision sensor 11 is approximated to a reference image, changes at least one selected from a group of the imaging position and the imaging orientation of the vision sensor 11 based on the movement amount (correction amount), and corrects the operation of the movable type robot 10 based on the information of the vision sensor 11 after the change.

For ease of description, it is assumed that the movement amount (correction amount) of the movable type robot 10 is a movement amount of at least one selected from a group of the imaging position and the imaging orientation of the vision sensor 11 (a movement amount of the camera coordinate system C). The movement amount (correction amount) can be represented by, for example, a position and orientation C ($^{c}x_{c}$, $^{c}y_{c}$, $^{c}z_{c}$, $^{c}w_{c}$, $^{c}p_{c}$, $^{c}r_{c}$) of the camera coordinate system C' after movement in the camera coordinate system C before the movement.

In another embodiment, the movement amount (correction amount) of the movable type robot 10 may be a movement amount of at least one selected from a group of the position and the orientation of a leading end (e.g., a center of a flange) of the robot 10a (a movement amount of the flange coordinate system), or may be a movement amount of at least one selected from a group of the position and the orientation of the tool 10c at a tool center point (TCP) (a movement amount of the tool coordinate system).

Referring to FIG. 2 again, the robot system 1 of the second embodiment is different from the robot system 1 of the first embodiment in that the correction amount calculating unit 30 includes a movement amount calculating unit 30b. The movement amount calculating unit 30b is configured by a part or all of a computer program, but is not limited thereto, and may be configured by a part or all of a semiconductor integrated circuit in another embodiment.

After the movable type robot 10 (the convey device 10b) is manually or automatically moved to another stopping position or another stopping orientation, or after the machine 20 or the workpiece W which is a work target is manually or automatically moved to another position or another orientation, the control unit 31 operates the movable type robot 10 and moves the vision sensor 11 to the imaging positions and orientations C1 to C6 taught in advance. After the movement, the control unit 31 transmits an imaging command to the vision sensor 11, and the vision sensor 11 images the reference point T at the imaging positions and orientations C1 to C6 in response to the imaging command.

The movement amount calculating unit 30b determines whether or not the reference point T is included in a detected image acquired from the vision sensor 11. When the reference point T is not included in the detected image, the movement amount calculating unit 30b transmits an arbitrary movement amount (correction amount) to the control unit 31, and the control unit 31 changes at least one selected from a group of the imaging position and the imaging orientation of the vision sensor 11 based on the arbitrary movement amount (correction amount) so as to operate the movable type robot 10. The arbitrary movement amount (correction amount) may be a movement amount (correction amount) designated in advance, and is represented by, for example, C ($^{c}x_{sc}$, $^{c}y_{sc}$, $^{c}z_{sc}$, $^{c}w_{sc}$, $^{c}p_{sc}$, $^{c}r_{sc}$). For example, the arbitrary movement amount (correction amount) includes four movement amounts (correction amounts) by which the imaging position before the change is, by a predetermined amount, sequentially translated up, down, left, and right, four movement amounts (correction amounts) by which the imaging orientation before the change is, by a predetermined amount, sequentially rotated up, down, left, and right, and four movement amounts (correction amounts) combining these. In another embodiment, the arbitrary correction amount may be a shift amount in the first embodiment. After the change, the control unit 31 transmits an imaging command to the vision sensor 11, and the vision sensor 11 images the reference point T in response to the imaging command.

On the other hand, when the reference point T is included in the detected image, the movement amount calculating unit 30b calculates a movement amount (correction amount) such that the detected image acquired from the vision sensor 11 is approximated to the reference image stored in advance in the storage 33. The movement amount (correction amount) is calculated by using machine learning to be described below.

Next, the movement amount calculating unit 30b determines whether or not the calculated movement amount (correction amount) is equal to or smaller than a threshold value. When the movement amount (correction amount) is larger than the threshold value, the reference point T is highly unlikely to be located at ends of the field of view of the vision sensor 11. Thus, the movement amount calculating unit 30b transmits the calculated movement amount (correction amount) to the control unit 31, and the control unit 31 changes at least one selected from a group of the imaging position and the imaging orientation of the vision sensor 11 based on the calculated movement amount (correction amount) so as to operate the movable type robot 10. After the change, the control unit 31 transmits an imaging command to the vision sensor 11, and the vision sensor 11 images the reference point T in response to the imaging command.

On the other hand, when the movement amount (correction amount) is equal to or smaller than the threshold value, the reference point T is highly likely to be located at the ends of the field of view of the vision sensor 11. Thus, the movement amount calculating unit 30b transmits a command for calculating a shift amount (correction amount) to the shift amount calculating unit 30a, and the shift amount calculating unit 30a calculates the shift amount (correction amount) of the movable type robot 10 from at least one selected from a group of the reference position and the reference orientation with respect to the workspace S as described in the first embodiment.

The shift amount calculating unit 30a transmits the calculated shift amount (correction amount) to the control unit 31, and the control unit 31 corrects the operation of the movable type robot 10 based on the shift amount (correction amount). The control unit 31 corrects the operation of the robot 10a based on the shift amount (correction amount), but may correct the operation of the convey device 10b based on the shift amount (correction amount) in another embodiment in which the convey device 10b is an automatic convey device.

Figure 7:
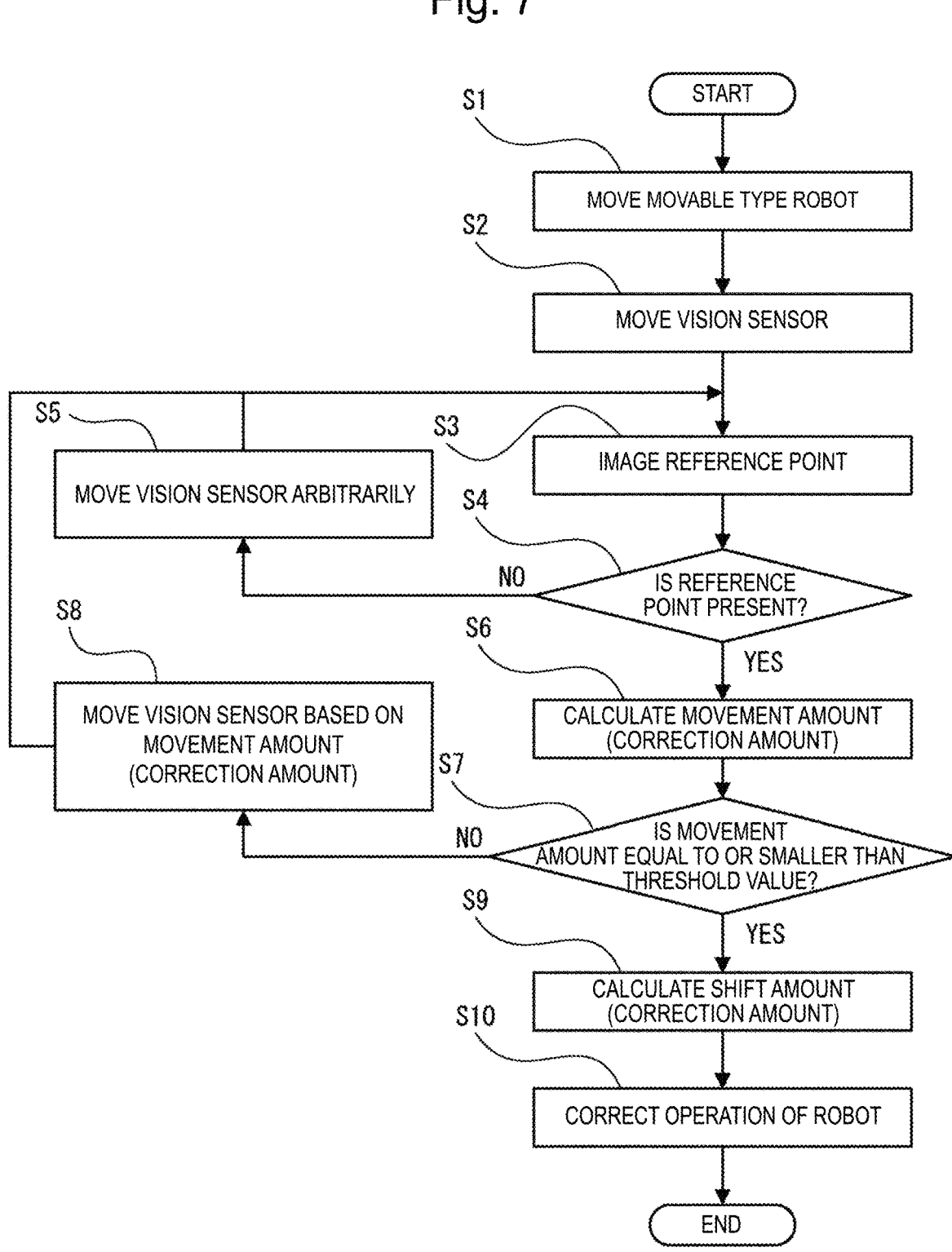
FIG. 7 is a correction flowchart for a robot system of a second embodiment.
Figure 8:
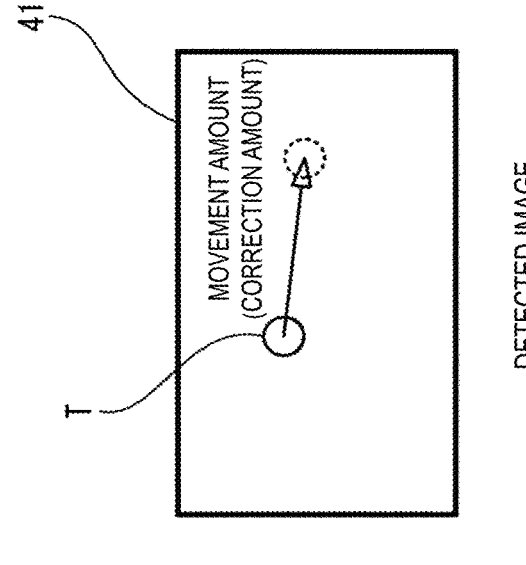
FIG. 8 is an explanatory diagram of a principle for calculating a movement amount (correction amount) of a robot of the second embodiment.

The detailed operation of the robot system 1 of the second embodiment will be described below with reference to FIG. 7 and FIG. 8. FIG. 7 is a correction flowchart for the robot system 1 of the second embodiment. First, in step S1, the movable type robot 10 (the convey device 10b) is manually or automatically moved to the vicinity of another machine 20 or another workpiece W. In step S2, the control unit 31 operates the movable type robot 10 and moves the vision sensor 11 to the imaging positions and orientations C1 to C6 (see FIG. 5) taught in advance.

In step S3, the vision sensor 11 images the reference points Ta, Tb, and Tc at the imaging positions and orientations C1 to C6. In step S4, the movement amount calculating unit 30b determines whether or not the reference points Ta, Tb, and Tc are included in a detected image acquired from the vision sensor 11. Image processing such as matching processing may be used for detecting the reference points Ta, Tb, and Tc. When the reference points Ta, Tb, and Tc are not included in the detected image (NO in step S4), the control unit 31 automatically changes the imaging positions and orientations C1 to C6 of the vision sensor 11 based on an arbitrary movement amount (correction amount) so as to operate the movable type robot 10. In other words, the imaging positions and orientations C1 to C6 are corrected (transformed) to imaging positions and orientations C1' to C6' based on C ($^c x_{sc'}$, $^c y_{sc'}$, $^c z_{sc'}$, $^c w_{sc'}$, $^c p_{sc'}$, $^c r_{sc'}$) which is the arbitrary movement amount (correction amount) by, for example, the following equation.

[Math. 9]

$$
\begin{pmatrix}
^{m'}x_{c1'} & ^{m'}x_{c2'} & \dots & ^{m'}x_c \\
^{m'}y_{c1'} & ^{m'}y_{c2'} & \dots & ^{m'}y_c \\
^{m'}z_{c1'} & ^{m'}z_{c2'} & \dots & ^{m'}z_c \\
1 & 1 & \dots & 1
\end{pmatrix} =
\qquad \text{Equation 9}
$$

$$
\begin{pmatrix}
r11 & r12 & r13 & ^c x_{sc'} \\
r21 & r22 & r23 & ^c y_{sc'} \\
r31 & r32 & r33 & ^c z_{sc'} \\
0 & 0 & 0 & 1
\end{pmatrix}
\begin{pmatrix}
^{m'}x_{c1} & ^{m'}x_{c2} & \dots & ^{m'}x_{c6} \\
^{m'}y_{c1} & ^{m'}y_{c2} & \dots & ^{m'}y_{c6} \\
^{m'}z_{c1} & ^{m'}z_{c2} & \dots & ^{m'}z_{c6} \\
1 & 1 & \dots & 1
\end{pmatrix}
$$

$$r11 = \cos{^c r_{sc'}} \cos{^c p_{sc'}}$$
$$r12 = \cos{^c r_{sc'}} \sin{^c p_{sc'}} \sin{^c w_{sc'}} - \sin{^c r_{sc'}} \cos{^c w_{sc'}}$$
$$r13 = \cos{^c r_{sc'}} \sin{^c p_{sc'}} \cos{^c w_{xc'}} + \sin{^c r_{xc'}} \sin{^c w_{xc'}}$$
$$r21 = \sin{^c r_{sc'}} \cos{^c p_{sc'}}$$
$$r22 = \sin{^c r_{sc'}} \sin{^c p_{sc'}} \sin{^c w_{sc'}} + \cos{^c r_{sc'}} \cos{^c w_{sc'}}$$
$$r23 = \sin{^c r_{sc'}} \sin{^c p_{sc'}} \cos{^c w_{sc'}} - \cos{^c r_{sc'}} \sin{^c w_{sc'}}$$
$$r31 = -\sin{^c p_{sc'}}$$
$$r33 = \cos{^c p_{sc'}} \cos{^c w_{sc'}}$$

Then, returning to step S3, the vision sensor 11 images the reference points Ta, Tb, and Tc again at the changed imaging positions and orientations C1' to C6', and in step S4, the movement amount calculating unit 30b determines again whether or not the reference points Ta, Tb, and Tc are included in a detected image from the vision sensor 11. When the reference points Ta, Tb, and Tc are included in the detected image (YES in step S4), the movement amount calculating unit 30b calculates a movement amount (correction amount) such that the detected image acquired from the vision sensor 11 is approximated to the reference image stored in advance in the storage 33.

The machine learning used for calculating a movement amount (correction amount) will be described below with reference to FIG. 8. This is an explanatory diagram of a principle for calculating a movement amount (correction amount) of the robot of the second embodiment. The movement amount calculating unit 30b observes, as a state variable, the detected image acquired from the vision sensor 11 and the movement amount (correction amount) of the movable type robot 10 calculated so as to approximate the detected image to the reference image. In addition, the movement amount calculating unit 30b acquires the reference image from the storage 33 as determination data.

Next, the movement amount calculating unit 30b learns a movement amount (correction amount) by which the movable type robot 10 is moved from at least one selected from a group of an arbitrary position and an arbitrary orientation to at least one selected from a group of a reference position and a reference orientation in accordance with a training dataset composed of a combination of the state variable and the determination data.

The movement amount calculating unit 30*b* may calculate a reward based on at least one selected from a group of the imaging position and the imaging orientation of the vision sensor 11 after the movement and the reference position of the reference point T, and update a function for estimating a movement amount (correction amount) of the vision sensor 11 from a current state variable based on the reward. In other words, the movement amount calculating unit 30*b* may perform reinforcement learning using so-called Q-learning.

Alternatively, the movement amount calculating unit 30*b* may perform supervised learning using, as labels, a detected image acquired from the vision sensor 11 that has moved to at least one selected from a group of a predetermined position and a predetermined orientation, and a data set of movement amounts (correction amounts) of the vision sensor 11 from at least one selected from a group of the predetermined position and the predetermined orientation to the reference position of the reference point T. In performing the supervised learning, a reference image captured at at least one selected from a group of a reference position and a reference orientation and at least one selected from a group of the reference position and the reference orientation are stored, and then, after movement to an appropriate position, a movement amount (correction amount) of the movement and a detected image captured at at least one selected from a group of the position and the orientation after the movement is acquired. By preparing a plurality of these datasets, a relationship between a change in an image and a movement amount (correction amount) can be learned, and a large amount of learning datasets can be automatically acquired.

The control unit 31 may move the vision sensor 11 based on a movement amount (correction amount) calculated so as to approximate a detected image acquired from the vision sensor 11 to the reference image, and give a higher reward the closer at least one selected from a group of the position and the orientation of the vision sensor 11 after the movement becomes to the reference position and the reference orientation.

Preferably, the movement amount calculating unit 30*b* updates an action value table corresponding to the movement amount (correction amount) of the vision sensor 11 based on the state variable and the reward. Preferably, the movement amount calculating unit 30*b* calculates the observed state variable with a multilayer structure and updates an action value table for determining an action value in real time. In this regard, a so-called multilayer neural network can be used as a method of calculating the state variable with a multilayer structure.

Based on a state variable and a reward of another movable type robot having the same configuration as the movable type robot 10, the movement amount calculating unit 30*b* may update a value function corresponding to a movement amount (correction amount) of a vision sensor of the other movable type robot. In other words, instead of updating an own value function using the value function learned and updated by the movement amount calculating unit 30*b*, the own value function may be updated using the value function updated by another machine learning apparatus. For example, data may be transmitted and received between a plurality of controllers 12, and the controller 12 may use a learning content of another controller 12 for its own learning.

The movement amount calculating unit 30*b* may be configured to relearn and update a movement amount (correction amount) of the movable type robot 10 in accordance with an additional training dataset composed of a combination of a current state variable and determination data.

Preferably, the movement amount calculating unit 30*b* makes a decision on an operation command for the movable type robot 10 based on a result of learning according to the training dataset. The movement amount calculating unit 30*b* calculates a movement amount (action data) of the movable type robot 10 for approximating the reference point T captured by the vision sensor 11 to the reference point T of the reference image by using a detected image captured at at least one selected from a group of the imaging position and the imaging orientation of the vision sensor 11 after movement as a state variable and the reference image as determination data. For example, the movement amount calculating unit 30*b* calculates a movement amount (correction amount) of the vision sensor 11 such that a detected image acquired from the vision sensor 11 that has moved to an arbitrary position is approximated to the reference image.

Referring to FIG. 7 again, in step S7, the movement amount calculating unit 30*b* determines whether or not the calculated movement amount (correction amount) is equal to or smaller than a threshold value. When the movement amount (correction amount) is larger than the threshold value (NO in step S7), the reference points Ta, Tb, and Tc are highly unlikely to be located at ends of the field of view of the vision sensor 11. Thus, in step S8, the control unit 31 changes the imaging positions and orientations C1 to C6 of the vision sensor 11 based on the calculated movement amount (correction amount) so as to operate the movable type robot 10. Then, returning to step S3, the vision sensor 11 images the reference points Ta, Tb, and Tc again at the changed imaging positions and orientations C1' to C6', and in step S4, the movement amount calculating unit 30*b* determines again whether or not the reference points Ta, Tb, and Tc are included in a detected image from the vision sensor 11. When the reference points Ta, Tb, and Tc are included in the detected image (YES in step S4), the movement amount calculating unit 30*b* calculates a movement amount (correction amount) again such that the detected image acquired from the vision sensor 11 is approximated to the reference image.

On the other hand, when the movement amount (correction amount) is equal to or smaller than the threshold value (YES in step S7), the reference points Ta, Tb, and Tc are highly likely to be located at the ends of the field of view of the vision sensor 11. Thus, in step S9, the shift amount calculating unit 30*a* calculates a shift amount (correction amount) of the movable type robot 10 from at least one selected from a group of the reference position and the reference orientation with respect to the workspace S as described in the first embodiment. Then, in step S10, the control unit 31 corrects the operation of the movable type robot 10 based on the shift amount (correction amount). The control unit 31 corrects the operation of the robot 10*a* based on the shift amount (correction amount), but may correct the operation of the convey device 10*b* based on the shift amount (correction amount) in another embodiment in which the convey device 10*b* is an automatic convey device.

As described above, according to the robot system 1 of the second embodiment, even when the stopping position or the stopping orientation of the movable type robot 10 (the convey device 10*b*) is changed, or even when the position or the orientation of the machine 20 or the workpiece W which is a work target is changed, a movement amount (correction amount) is calculated using machine learning, and the movable type robot 10 is operated based on the movement amount (correction amount) so as to repeat the movement of and the imaging by the vision sensor 11. This eliminates time and effort or a trial-and-error process for manually changing the stopping position or the stopping orientation of the movable type robot (the convey device 10*b*), manually changing the position or the orientation of the machine 20 or the workpiece W which is a work target, or re-teaching an imaging position or an imaging orientation so as to ensure that the reference points Ta, Tb, and Tc are located at the ends of the field of view of the vision sensor 11. As a result, a process of correcting the robot can be automatized.

Further, according to the robot system 1 of the second embodiment, it is determined whether or not the reference points Ta, Tb, and Tc are included in a detected image, and, when the reference points Ta, Tb, and Tc are not included in the detected image, the imaging positions and orientations C1 to C6 of the vision sensor 11 are automatically changed based on an arbitrary movement amount (correction amount). This eliminates time and effort or a trial-and-error process for manually changing the stopping position or the stopping orientation of the movable type robot (the convey device 10*b*), manually changing the position or the orientation of the machine 20 or the workpiece W which is a work target, or re-teaching an imaging position or an imaging orientation so as to ensure that the reference points Ta, Tb, and Tc are within the field of view of the vision sensor 11. As a result, a process of correcting the robot can be automatized.

The aforementioned computer program may be recorded and provided in a computer-readable non-transitory recording medium, for example, a CD-ROM or the like or may be distributed and provided from a server device on a wide area network (WAN) or a local area network (LAN) via wired or wireless connection.

Although various embodiments have been described in this specification, the present invention is not limited to the above-described embodiments, and it is to be understood that various changes can be made without departing from the scope of the appended claims.

The invention claimed is:

1. A controller, comprising:
a processor configured to
    calculate a correction amount of an operation of a movable type robot with respect to a workspace from information of a vision sensor mounted at the movable type robot,
    change at least one selected from a group of an imaging position and an imaging orientation of the vision sensor based on the correction amount, and
    correct the operation of the movable type robot based on information of the vision sensor after the change, wherein
  when a reference point of the workspace is not included in a detected image acquired from the vision sensor, the processor is configured to change at least one selected from the group of the imaging position and the imaging orientation of the vision sensor based on an arbitrary correction amount.

2. The controller of claim 1, wherein
the processor is configured to change at least one selected from the group of the imaging position and the imaging orientation of the vision sensor based on the correction amount of a past time.

3. The controller of claim 1, wherein
the processor is configured to
    calculate a shift amount of the movable type robot from at least one selected from a group of a reference position and a reference orientation with respect to the workspace as the correction amount based on detected three-dimensional information detected based on the information of the vision sensor and reference three-dimensional information, and
    change at least one selected from the group of the imaging position and the imaging orientation of the vision sensor based on the shift amount.

4. The controller of claim 1, wherein
the processor is configured to
    calculate the correction amount by using machine learning, and
    repeat movement and imaging of the vision sensor based on the correction amount.

5. A controller, comprising:
a processor configured to
    calculate a correction amount of an operation of a movable type robot with respect to a workspace from information of a vision sensor mounted at the movable type robot,
    change at least one selected from a group of an imaging position and an imaging orientation of the vision sensor based on the correction amount, and
    correct the operation of the movable type robot based on information of the vision sensor after the change, wherein
  when a reference point of the workspace is included in a detected image acquired from the vision sensor, the processor is configured to
    calculate a movement amount of the movable type robot as the correction amount such that the detected image is approximated to a reference image, and
    change at least one selected from the group of the imaging position and the imaging orientation of the vision sensor based on the movement amount.

6. A robot system, comprising:
a movable type robot;
a vision sensor mounted at the movable type robot; and
a processor configured to
    calculate a correction amount of an operation of the movable type robot with respect to a workspace from information of the vision sensor,
    change at least one selected from a group of an imaging position and an imaging orientation of the vision sensor based on the correction amount, and
    correct the operation of the movable type robot based on information of the vision sensor after the change, wherein
  when a reference point of the workspace is included in a detected image acquired from the vision sensor, the processor is configured to
    calculate a movement amount of the movable type robot as the correction amount such that the detected image is approximated to a reference image, and
    change at least one selected from the group of the imaging position and the imaging orientation of the vision sensor based on the movement amount.

\* \* \* \* \*